United States Patent
Tomei

(10) Patent No.: US 9,827,691 B2
(45) Date of Patent: Nov. 28, 2017

(54) SCRIBING WHEEL, METHOD FOR MANUFACTURING THE SCRIBING WHEEL, AND SCRIBING METHOD

(71) Applicant: MITSUBOSHI DIAMOND INDUSTRIAL CO., LTD, Osaka (JP)

(72) Inventor: Naoko Tomei, Osaka (JP)

(73) Assignee: MITSUBOSHI DIAMOND INDUSTRIAL CO., LTD., Osaka (JP)

( * ) Notice: Subject to any disclaimer, the term of this patent is extended or adjusted under 35 U.S.C. 154(b) by 252 days.

(21) Appl. No.: 14/471,495

(22) Filed: Aug. 28, 2014

(65) Prior Publication Data

US 2014/0366701 A1     Dec. 18, 2014

Related U.S. Application Data

(63) Continuation of application No. 13/490,996, filed on Jun. 7, 2012, now Pat. No. 9,149,953.

(30) Foreign Application Priority Data

Jun. 8, 2011   (JP) ................................. 2011-128051
Apr. 24, 2012  (JP) ................................. 2012-098335

(51) Int. Cl.
*B28D 1/24*     (2006.01)
*B28D 5/00*     (2006.01)
(Continued)

(52) U.S. Cl.
CPC .............. *B28D 1/225* (2013.01); *B24B 3/36* (2013.01); *B26D 1/0006* (2013.01); *B26D 3/08* (2013.01);
(Continued)

(58) Field of Classification Search
CPC ......... C30B 29/06; C30B 11/14; C30B 11/00; C30B 11/02; C30B 28/06; C30B 11/003; B26D 1/0006; B26D 2001/002; B26D 2001/0053; B26D 2001/006; B26D 3/06; B26D 3/08; B28D 1/225; B28D 5/0011; C03B 29/06; C03B 11/14; C03B 11/00; C03B 11/02; C03B 28/06; C03B 11/003
See application file for complete search history.

(56) References Cited

U.S. PATENT DOCUMENTS 5,295,305 A * 3/1994 Hahn ................... B26B 21/60
                                                30/346.53
5,795,648 A * 8/1998 Goel .................. B26B 21/60
                                                30/346.53
(Continued)

FOREIGN PATENT DOCUMENTS

EP       2135848 A2 * 12/2009
EP       2292398 A1 *  3/2011
(Continued)

*Primary Examiner* — Stephen Choi
(74) *Attorney, Agent, or Firm* — McGlew and Tuttle, P.C.

(57) ABSTRACT

A scribing wheel for scribing a brittle material-made substrate. A disc-shaped scribing-wheel base material in use is so designed that a mid-portion of a disc periphery has the largest diameter. A diamond film is formed on the periphery by a CVD method. The periphery is ground in the middle so that a plane including a circle defined by ridge line becomes perpendicular to the central axis of the scribing wheel.

20 Claims, 11 Drawing Sheets

(51) Int. Cl.
  *C03B 33/10* (2006.01)
  *B28D 1/22* (2006.01)
  *B24B 3/36* (2006.01)
  *B26D 1/00* (2006.01)
  *B26D 3/08* (2006.01)

(52) U.S. Cl.
  CPC ...... *C03B 33/107* (2013.01); *B26D 2001/002* (2013.01); *B26D 2001/0053* (2013.01); *Y10T 83/0341* (2015.04); *Y10T 83/0385* (2015.04)

(56) References Cited

U.S. PATENT DOCUMENTS

| | | | | |
|---|---|---|---|---|
| 5,855,974 A | * | 1/1999 | Wu | B24D 18/0018 134/2 |
| 6,468,642 B1 | * | 10/2002 | Bray | B26B 21/60 428/216 |
| 7,060,367 B2 | * | 6/2006 | Yamada | B26B 21/56 30/346.53 |
| 2009/0245945 A1 | | 10/2009 | Ostendarp | |

FOREIGN PATENT DOCUMENTS

| | | | |
|---|---|---|---|
| JP | H05-254865 A | | 10/1993 |
| JP | 2002370107 A | * | 12/2002 |
| JP | 2011-031484 A | | 2/2011 |
| JP | 2012-11475 A | | 1/2012 |
| JP | 201211475 A | * | 1/2012 |
| KR | 2006-0122926 A | | 11/2006 |
| KR | 2011-0013234 A | | 2/2011 |
| TW | 200900366 A | | 1/2009 |
| TW | 200914191 A | | 4/2009 |
| WO | 2005072926 A1 | | 8/2005 |
| WO | 2008129943 A1 | | 10/2008 |
| WO | WO-2010112496 A1 | * | 10/2010 |

* cited by examiner

F I G. 1 B
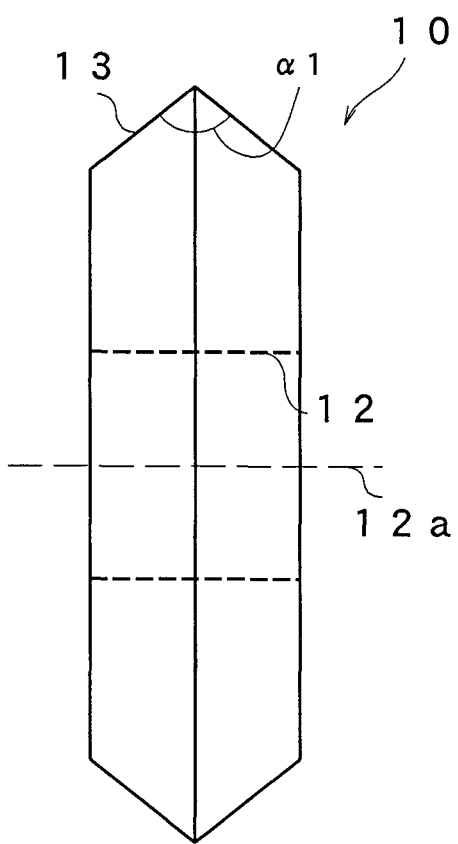

F I G. 8C
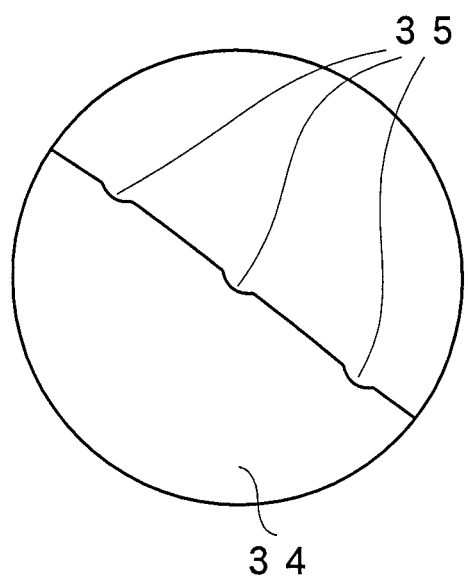

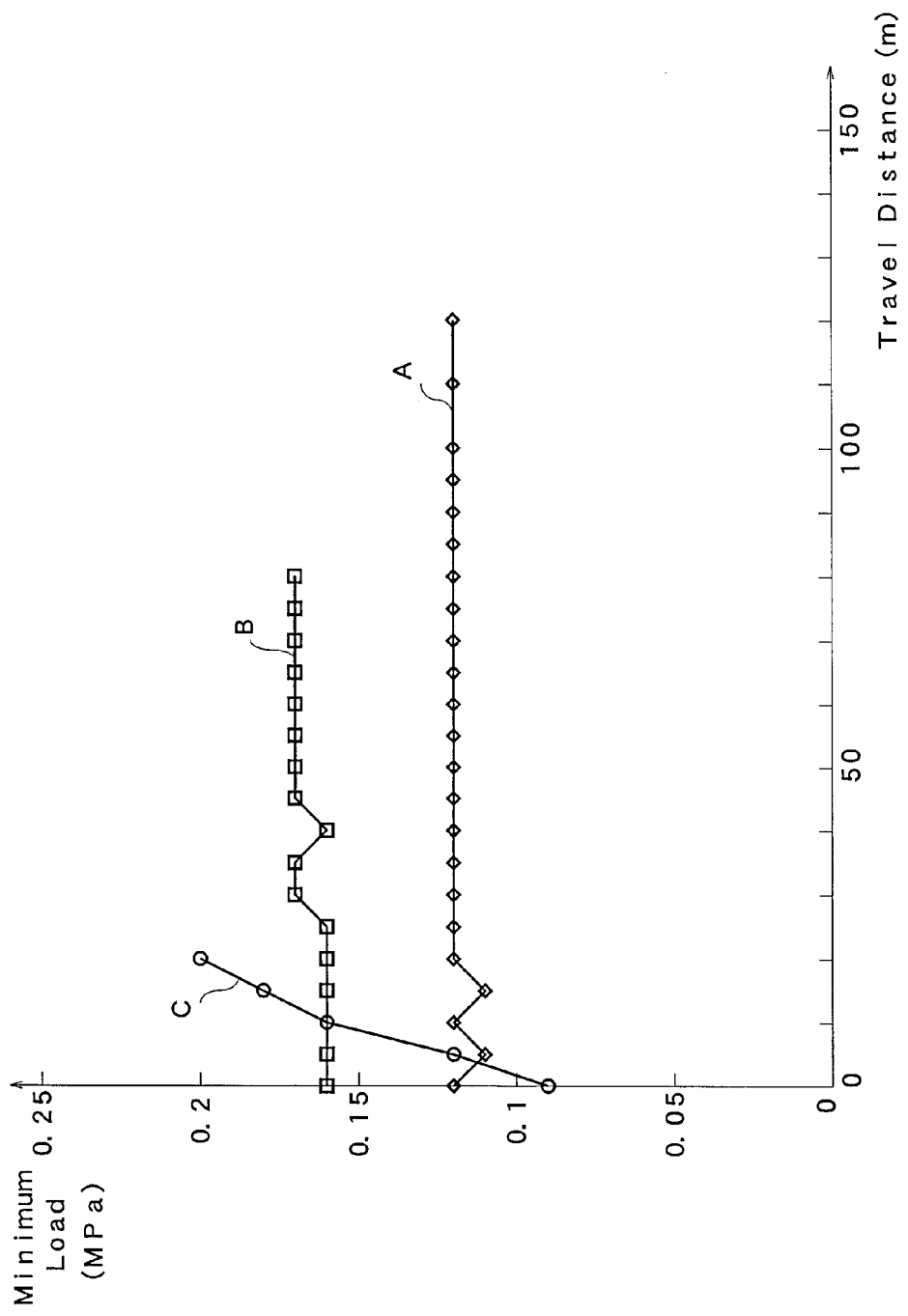

SCRIBING WHEEL, METHOD FOR MANUFACTURING THE SCRIBING WHEEL, AND SCRIBING METHOD

CROSS REFERENCE TO RELATED APPLICATIONS

This application is a continuation application under 37 CFR 1.53(b) of pending prior U.S. patent application Ser. No. 13/490,996 filed Jun. 7, 2012, which claims the priority of Japanese Patent Application JP 2011-128051 of Jun. 8, 2011 and Japanese Patent Application JP 2012-098335 of Apr. 24, 2012. The entire contents of each application is hereby incorporated by reference in its entirety.

FIELD OF THE INVENTION

The present invention relates to a scribing wheel for scribing operation, which is brought into contact with a substrate made of a brittle material under pressure for rolling motion, as well as to a method for manufacturing the scribing wheel and a scribing method.

BACKGROUND OF THE INVENTION

Conventionally, as disclosed in International Publication WO 2003/51784, a scribing wheel is constructed of, as a base material, a disc made of a cemented carbide or polycrystalline sintered diamond (hereafter referred to as "PCD"). PCD is a substance resulting from the sintering of diamond particles together with cobalt or the like. The scribing wheel has a V-shaped cutting edge at its periphery, which is formed by cutting the circumferential edge of the disc base material at a bevel so as to provide oppositely inclined surfaces. The thusly configured scribing wheel is attached for axial rotation to a scribing head or the like of a scribing apparatus, and is pressed against a substrate made of a brittle material under a predetermined load while being moved over the plane of the brittle material-made substrate. In this way, the substrate can be scribed.

The conventional-type scribing wheel made of polycrystalline sintered diamond (PCD) is composed of diamond particles and bonding materials. Thus, the scribing wheel incurs the drawback of having a short operating life especially when it is used for scribing on a brittle material-made substrate which is higher in hardness than glass, such as ceramic substrates, sapphire substrates, and silicon substrates. It is noted that ceramic substrates include substrates having built-in electronic components, such as a multilayer substrate made of high-temperature co-fired ceramic (HTCC substrate) and a multilayer substrate made of low-temperature co-fired ceramic (LTCC substrate). As another drawback of the conventional-type scribing wheel, even if the cutting edge is ground, the roughness of its ridge line cannot be reduced satisfactorily.

Therefore, when the scribing wheel is used for scribing on a brittle material-made substrate under an unduly large scribing load, after the breaking of the scribed substrate, the end face of the segmented substrate may suffer lack of strength.

SUMMARY OF THE INVENTION

The present invention has been made in view of the problems as mentioned supra, and accordingly its object is to provide a scribing wheel characterized by longer operating life and finer configuration, and a method of manufacturing the scribing wheel.

A scribing wheel of the present invention comprises: a scribing-wheel base material; a diamond film formed on a cutting-edge part of said scribing-wheel base material; and a ground region formed by grinding said diamond film by a mechanical grinding technique.

In the scribing wheel, said scribing-wheel base material may have a form of a disc with a largest-diameter part and inclined surfaces formed at its periphery.

In the scribing wheel, said scribing-wheel base material may have formed at its periphery a columnar circumferential surface whose axis coincides with a central axis.

In the scribing wheel, said scribing-wheel base material may have formed at its periphery a circumferential surface whose axis coincides with said central axis, the circumferential surface being curved either inwardly or outwardly.

In the scribing wheel, said scribing-wheel base material may have formed at its periphery a circumferential surface whose axis coincides with said central axis, the circumferential surface having a V-shaped section defined by either of an inwardly-bent shape or an outwardly-bent shape.

In the scribing wheel, said scribing-wheel base material may be made of cemented carbide.

In the scribing wheel, said scribing wheel may be designed as a scribing wheel for scribing ceramic substrates.

In the scribing wheel, a ridge part of said ground region may be formed with grooves that are spaced apart to provide projections in between.

A method for manufacturing a scribing wheel of the present invention in a form of a disc having a cutting edge formed along its periphery, comprises the steps of: forming a diamond film on a cutting-edge part at a periphery of a scribing-wheel base material by means of chemical vapor deposition; and grinding said diamond film-bearing surface by a mechanical grinding technique.

In the method for manufacturing a scribing wheel, said scribing-wheel base material may be constructed by grinding the scribing-wheel base disc, a center of which corresponds to a central axis, from opposite sides so that its periphery is cut at a bevel to provide a largest-diameter part.

In the present invention having such features, in contrast to a conventional-type scribing wheel employing a sintered diamond, that part of the scribing wheel which is brought into contact with a brittle material-made substrate is formed entirely of a diamond film. This makes it possible to achieve improvement in abrasion resistance and thus an increase in longevity in the scribing wheel. Moreover, in the scribing wheel, that part of the V-shaped cutting edge which is brought into contact with a brittle material-made substrate is formed entirely of a diamond film, wherefore the ridge line can be fine-grained. Accordingly, in the case of performing scribing on a brittle material-made substrate with use of this scribing wheel, as advantageous effects, upon the breaking of the scribed substrate, the end face of the segmented substrate can be made with greater accuracy and higher strength.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1B is a side view of the scribing wheel pertaining to the first embodiment;

FIG. 8C is an enlarged view of the circular area depicted in FIG. 8A; and

FIG. 9 is a graph showing the relationship between travel distance and minimum load as to examples 1 and 2 of the present invention and comparative example.

DESCRIPTION OF THE PREFERRED EMBODIMENTS

Figure 1A:
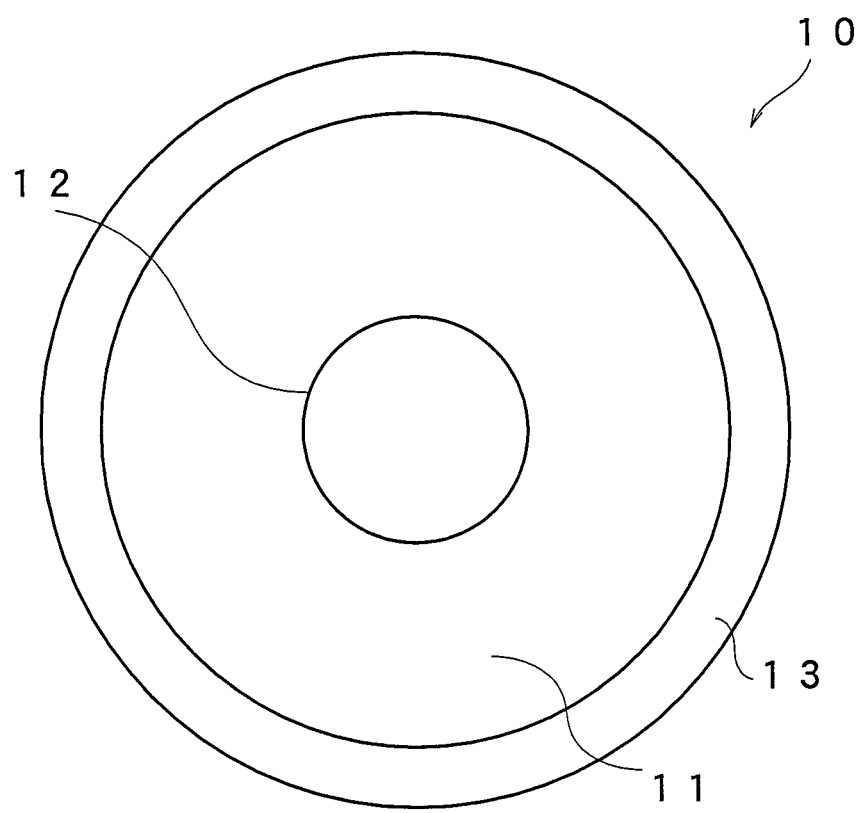
FIG. 1A is a front view of a scribing wheel in accordance with the first embodiment of the present invention.

FIG. 1A is a front view of a scribing wheel in accordance with an embodiment of the present invention, and FIG. 1B is a side view thereof. In the production of the scribing wheel, for example, as shown in FIG. 1A, the first step is to form a through hole 12 serving as an axial hole at the center of a cemented carbide or ceramic disc 11 prepared as a scribing-wheel base material. Then, the center of the through hole 12, namely the central axis of the disc 11 will be designated as 12a. A rotary shaft such as a motor is inserted into the through hole 12. As the rotary shaft is rotated about the central axis 12a, the disc 11 is ground throughout its periphery from opposite sides until the mid-portion of the periphery has the largest diameter, as shown in FIG. 1B, so that it takes on a substantially V-shaped vertical sectional profile defined by beveled surfaces and a ridge line. The V-shaped inclined surface thusly formed will be referred to as a ground surface 13. For example, an angle α1 of the vertex of the V-shaped ground surface 13 is set to be greater than or equal to 80 degrees, preferably greater than or equal to 90 degrees, while being set to be smaller than or equal to 150 degrees, preferably smaller than or equal to 140 degrees. If the vertex angle α1 is smaller than 80 degrees, the machining operation will be difficult. On the other hand, if the vertex angle α1 is greater than 150 degrees, the difference from a cutting-edge angle of a ground part will be too small.

Figure 2A:
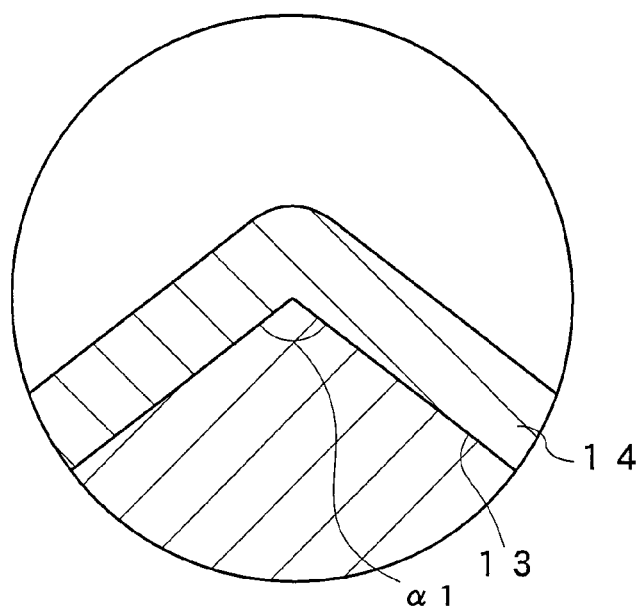
FIG. 2A is an enlarged sectional view of a ridge part of a cutting edge of the first embodiment.

Next, the formation of a diamond thin film will be explained with reference to FIG. 2A showing an enlarged sectional view of a ridge part of a cutting edge. To begin with, the V-shaped ground surface 13 is roughened in the interest of ease of adhesion of a diamond film.

Subsequently, core diamond particles having a particle size within a submicron range are formed on the beveled surfaces, and a diamond thin film is grown by a chemical vapor reaction. In this way, a diamond film 14 having a film thickness in a 10 μm to 30 μm range is formed on the V-shaped inclined part of the scribing wheel by means of chemical vapor deposition method (CVD method).

Figure 2B:
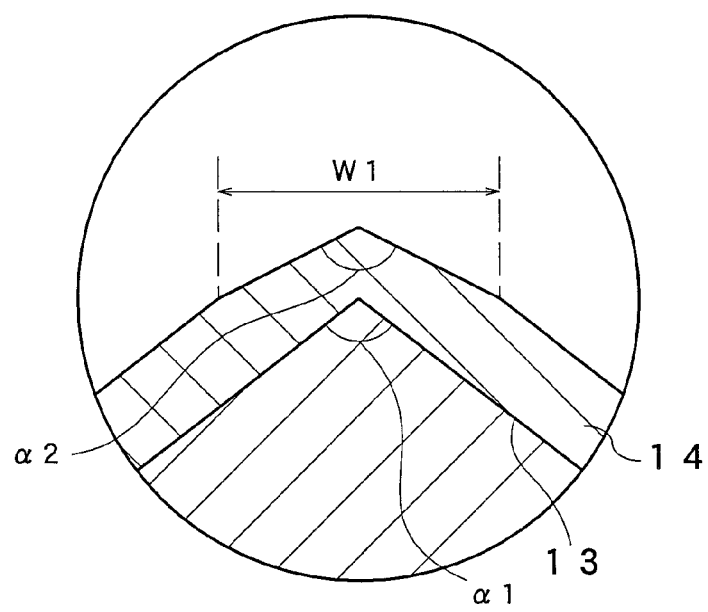
FIG. 2B is an enlarged sectional view of the ridge part of the first embodiment as observed after grinding process.

After the diamond film 14 is formed, the scribing wheel is ground at least at its front end so that the front end takes on a V-shaped vertical sectional profile, and the angle of the resultant cutting edge will be designated as α2. The grinding process is carried out based on various methods, including a mechanical grinding technique. For example, the grinding process may be conducted by the mechanical grinding technique using an abrasive material. In the case of using a honing stone in particular as the abrasive material, the beveled surfaces located on both sides of the cutting edge can be easily rendered uniform in surface roughness, and also the ridge line can be easily configured to have the form of a straight line as viewed laterally. The abrasive material should preferably have a grain size number of #9000 or above, more preferably a grain size number of #15000 or above. If the grain size number of the abrasive material is smaller than #9000, it will be difficult to adjust the arithmetic average roughness Ra of the ground cutting edge and ridge line to be smaller than or equal to 0.03 μm. In this case, film spalling or chipping is likely to occur during scribing operation, and in addition surface flaws tend to appear at the end face of the segmented brittle material-made substrate. FIG. 2B is a fragmentary enlarged sectional view showing a condition after grinding process. The angle α2 of the ground cutting edge is determined with consideration given to a target to be cut, but it is normally set to be greater than or equal to 85 degrees, preferably greater than or equal to 95 degrees, while being set to be smaller than or equal to 160 degrees, preferably smaller than or equal to 150 degrees. The difference between the vertex angle α1 of the ground surface 13 of the disc base material and the cutting-edge angle α2 falls within a range from 5 degrees to 20 degrees. If the difference is less than 5 degrees, it will be difficult to form a proper ridge line during grinding process. On the other hand, if the difference exceeds 20 degrees, the amount of grinding will be so large that much time needs to be taken for the working operation, or the film thickness of the ridge part will be so small that the diamond film becomes susceptible to spalling. Moreover, the thickness of the ground film falls within a range from 5 μm to 25 μm, and a plane including a circle defined by the ground ridge line is perpendicular to the central axis 12a. As a target region to be ground, it is enough to grind only a strip-like region including the ridge line located in the middle thereof. In FIG. 2B, the region having a width w1 represents the to-be-ground region around the front end, and the width w1 falls within a range from 10 μm to 30 μm, for example. The roughness Ra of the ground ridge line is set to be smaller than or equal to 0.03 μm, preferably smaller than or equal to 0.015 μm. Also, the inclined surface is ground until its roughness Ra becomes smaller than or equal to 0.03 μm, preferably smaller than or equal to 0.015 μm.

In the scribing wheel thusly ground, in contrast to a conventional-type scribing wheel employing sintered diamond, that part thereof which is brought into contact with a brittle material-made substrate is formed entirely of diamond. This makes it possible to improve the abrasion resistance of the scribing wheel. Moreover, since that part of the scribing wheel which is brought into contact with a brittle material-made substrate is formed entirely of a diamond film, it is possible to impart fine-grained texture to the cutting edge and the ridge line responsible for scribing operation. Accordingly, in the case of performing scribing on a brittle material-made substrate with use of this scribing wheel, as advantageous effects, upon the severing of the scribed brittle material-made substrate, the end face of the segmented substrate can be made with greater accuracy and higher strength. Moreover, the cutting edge and the ridge line are given fine-grained texture and therefore have little minute asperities ascribable to grinding striation. This makes it possible to produce the effect of decreasing the possibility of spalling of the diamond film. Therefore, the scribing wheel pursuant to the present invention is suitable for use in scribing operation for a relatively hard brittle material-made substrate such as a ceramic substrate.

Figure 3A:
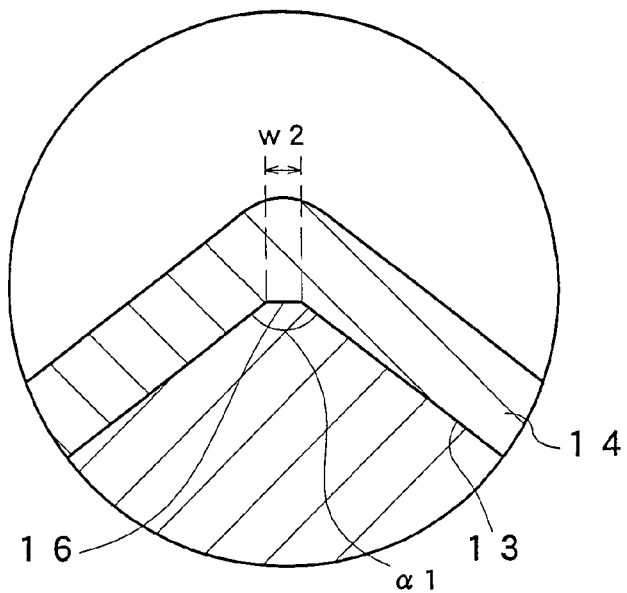
FIG. 3A is an enlarged sectional view of the cutting edge of the scribing wheel in accordance with the second embodiment of the present invention.
Figure 3B:
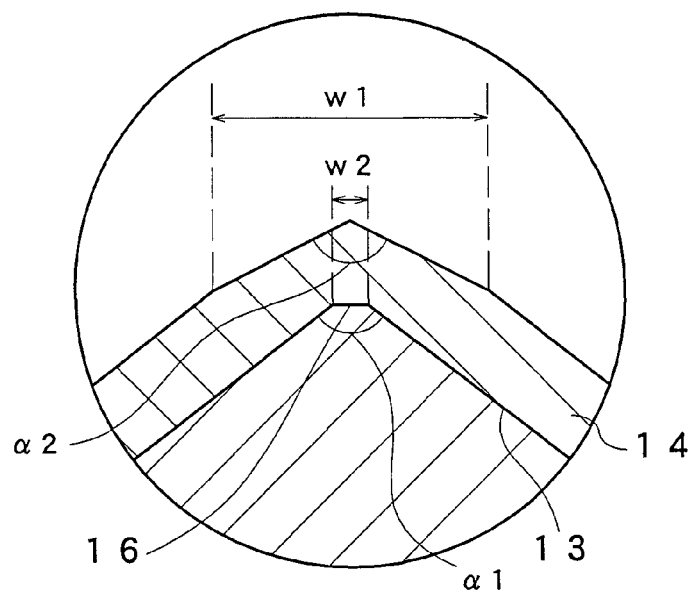
FIG. 3B is an enlarged sectional view of the ridge part of the second embodiment as observed after grinding process.

Next, the second embodiment of the present invention will be described. The constituent parts of this embodiment that are common to those of the preceding embodiment will be identified with the same reference symbols, and detailed descriptions thereof will be omitted. That is, only dissimilarities will be given below. In this embodiment, as shown in FIG. 3A illustrating an enlarged sectional view of the ridge part of the cutting edge, there is provided a circumferential surface 16 which is, when viewed in section, defined by a cylindrical column of predetermined diameter and predetermined short width, with its center made coincide with the central axis, lying on the ridge part of the scribing wheel. A width w2 of the circumferential surface 16 falls within a range from 2 μm to 10 μm, for example. Then, as is the case with the first embodiment, the ground surface 13 is coated with the diamond film 14 by the CVD method. Following the completion of the coating process, as shown in FIG. 3B, the scribing wheel is ground at its periphery to create a ridge line. At this time, a plane including a circle defined by the ground ridge line is perpendicular to the central axis 12a. If the width w2 is less than 2 μm, the process of formation of the circumferential surface 16 will be difficult. Furthermore, since the diamond film is formed over the plane of the ground surface 13, if the width w2 exceeds 10 μm, it will be difficult to form the ridge line through grinding process. The roughness of the ground ridge line, as well as the roughness Ra of the inclined part are similar to those of the first embodiment.

In this way, as achieved in the first embodiment, the abrasion resistance of the scribing wheel can be enhanced. Moreover, by virtue of the circumferential surface 16, it is possible to promote the adhesion of the diamond film 14 and thereby increase the film thickness of the diamond film 14. Accordingly, in the case of performing scribing on a brittle material-made substrate with use of this scribing wheel, upon the severing of the scribed brittle material-made substrate, the end face of the segmented substrate can be made with greater accuracy and higher strength.

Figure 4A:
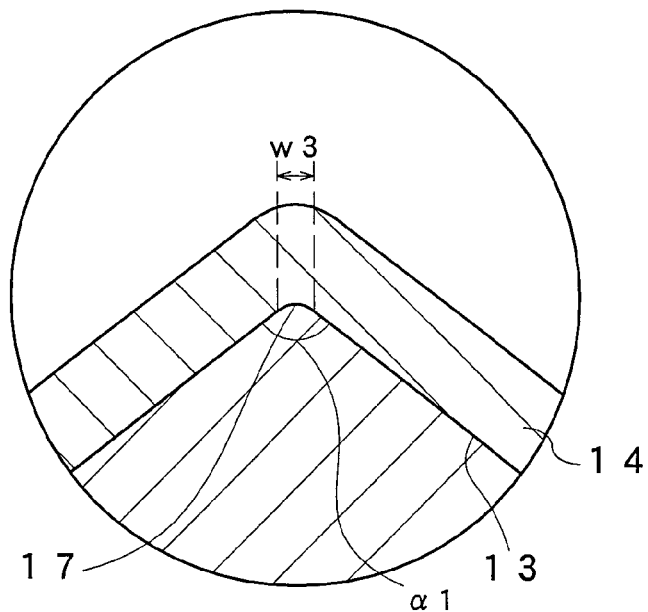
FIG. 4A is an enlarged sectional view of the cutting edge of the scribing wheel in accordance with the first example of the third embodiment of the present invention.
Figure 4B:
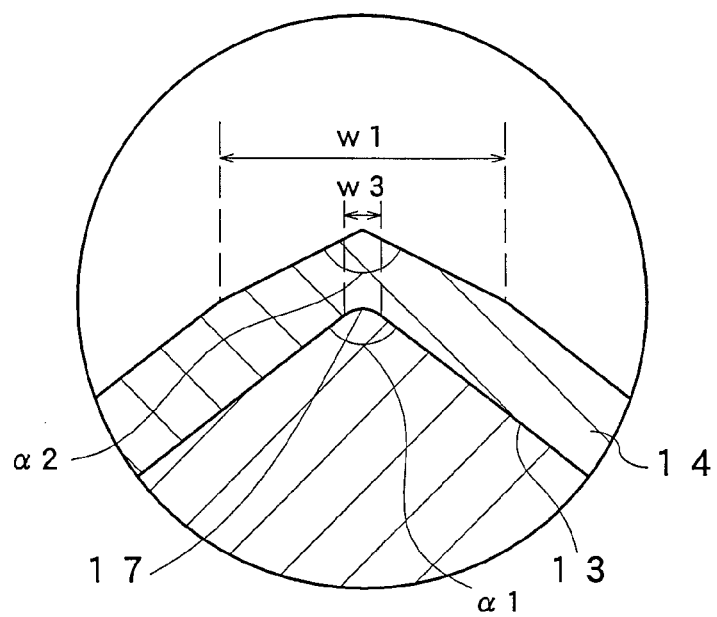
FIG. 4B is an enlarged sectional view of the ridge part of this example as observed after grinding process.

Next, the third embodiment of the present invention will be described. The constituent parts of this embodiment that are common to those of the preceding embodiment will be identified with the same reference symbols, and detailed descriptions thereof will be omitted. That is, only the dissimilarities will be given below. This embodiment is implemented by making modification to the circumferential surface of the second embodiment. In FIG. 4A, there is shown the first example of the modified circumferential surface, namely a circumferential surface 17 which is produced by curving the circumferential surface of the second embodiment outwardly in convex form. By the same token, just like the width w2, a width w3 of the convexly-curved circumferential surface 17 falls within a range from 2 μm to 10 μm. Then, as is the case with the first embodiment, the ground surface 13 is coated with the diamond film 14 by the CVD method. Following the completion of the coating process, as shown in FIG. 4B, the scribing wheel is ground at its periphery to create a ridge line.

Figure 5A:
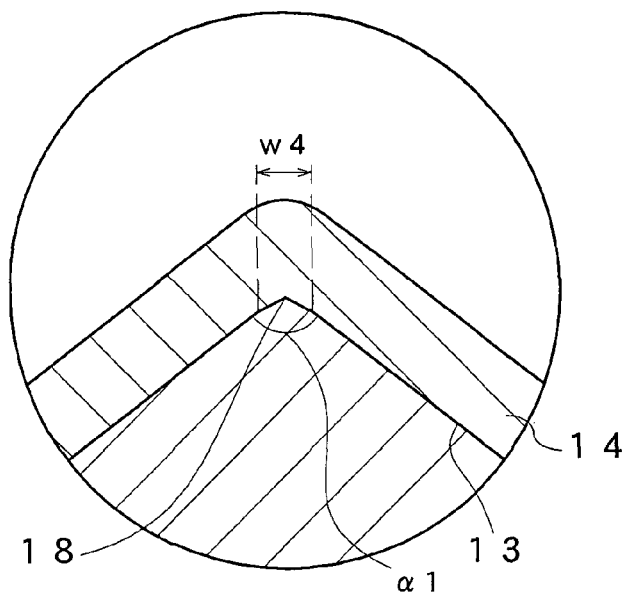
FIG. 5A is an enlarged sectional view of the cutting edge of the scribing wheel in accordance with the second example of the third embodiment of the present invention.
Figure 5B:
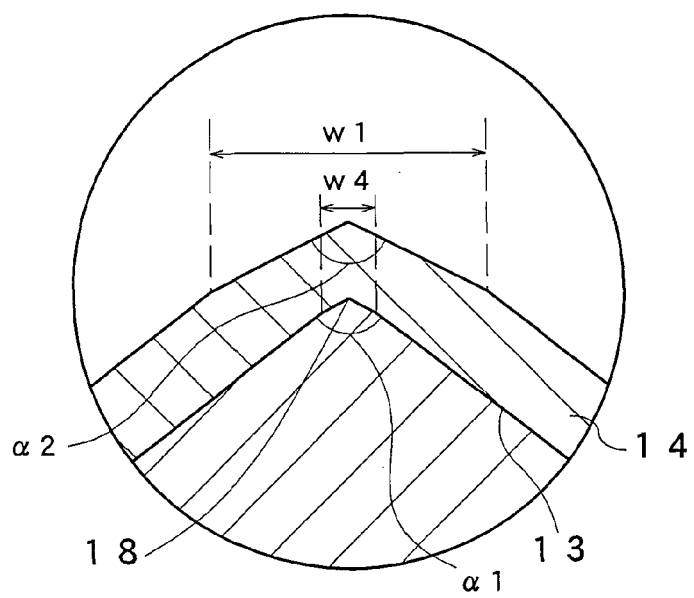
FIG. 5B is an enlarged sectional view of the ridge part of this example as observed after grinding process.

In FIG. 5A, there is shown the second example of the modified circumferential surface, namely a circumferential surface 18 which is produced by grinding the circumferential surface of the second embodiment so that it is stepped to provide two beveled surfaces defining a V-shaped configuration. By the same token, just like the width w2, a width w4 of the thusly bent circumferential surface 18 falls within a range from 2 μm to 10 μm. Then, as is the case with the first embodiment, the ground surface 13 is coated with the diamond film 14 by the CVD method. Following the completion of the coating process, as shown in FIG. 5B, the scribing wheel is ground at its periphery to create a ridge line.

Figure 6A:
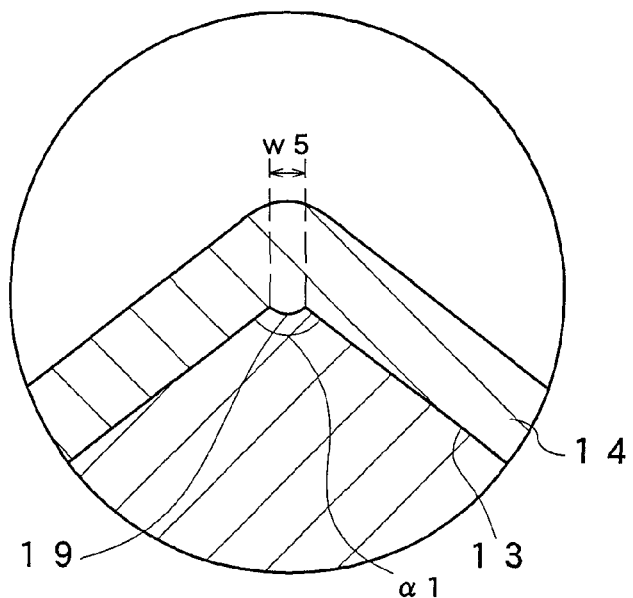
FIG. 6A is an enlarged sectional view of the cutting edge of the scribing wheel in accordance with the third example of the third embodiment of the present invention.
Figure 6B:
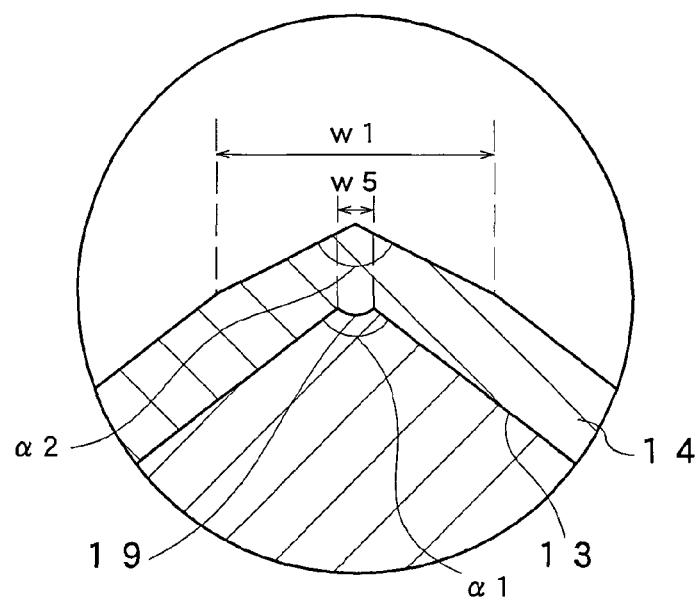
FIG. 6B is an enlarged sectional view of the ridge part of this example as observed after grinding process.

In FIG. 6A, there is shown the third example of the modified circumferential surface, namely a circumferential surface 19 which is produced by curving the circumferential surface of the second embodiment inwardly in concave form. By the same token, just like the width w2, a width w5 of the concavely-curved circumferential surface 19 falls within a range from 2 μm to 10 μm. Then, as is the case with the first embodiment, the ground surface 13 is coated with the diamond film 14 by the CVD method. Following the completion of the coating process, as shown in FIG. 6B, the scribing wheel is ground at its periphery to create a ridge line.

Figure 7A:
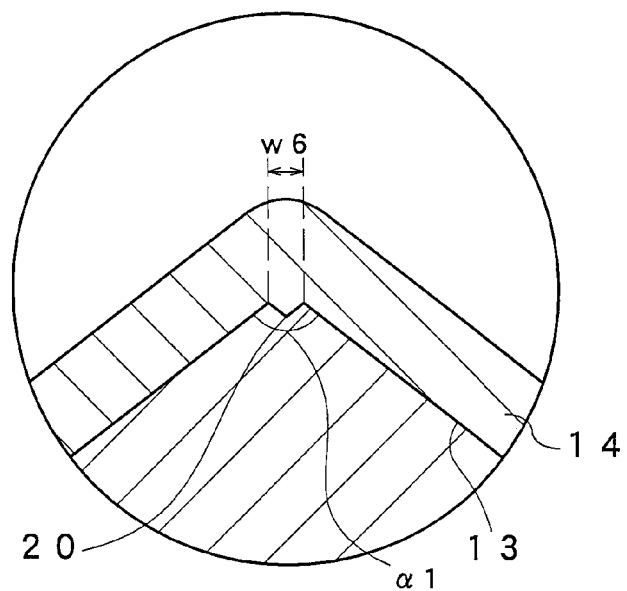
FIG. 7A is an enlarged sectional view of the cutting edge of the scribing wheel in accordance with the fourth example of the third embodiment of the present invention.
Figure 7B:
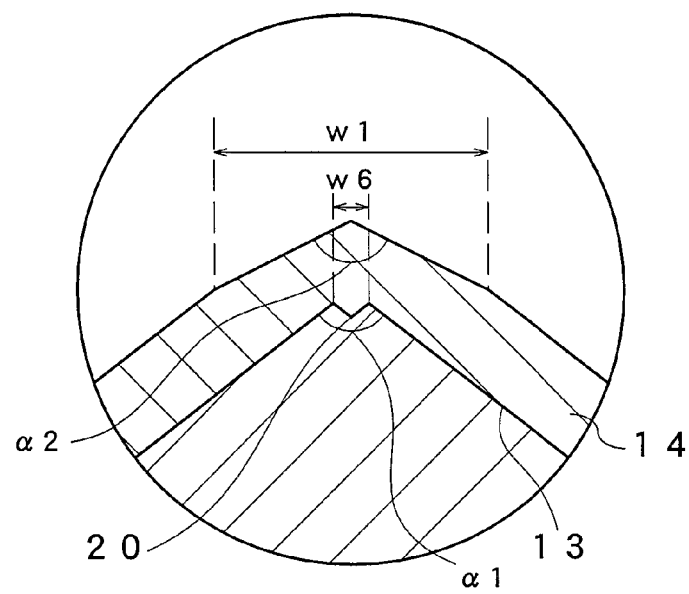
FIG. 7B is an enlarged sectional view of the ridge part of this example as observed after grinding process.

In FIG. 7A, there is shown the fourth example of the modified circumferential surface, namely a circumferential surface 20 which is produced by forming a V-shaped recess in the circumferential surface of the second embodiment. By the same token, just like the width w2, a width w6 of the circumferential surface 20 falls within a range from 2 μm to 10 μm. Then, as is the case with the first embodiment, the ground surface 13 is coated with the diamond film 14 by the CVD method. Following the completion of the coating process, as shown in FIG. 7B, the scribing wheel is ground at its periphery to create a ridge line.

Also in the third embodiment, the roughness of the ground ridge line, as well as the surface roughness of the ground inclined part are similar to those of the first embodiment. In each of the above examples, a plane including a circle defined by the ground ridge line is perpendicular to the central axis 12a. Moreover, by virtue of the circumferential surface 17, 18, 19, and 20, it is possible to promote the adhesion of the diamond film 14 and thereby increase the film thickness of the diamond film 14. Further, as achieved in the first embodiment, the abrasion resistance of the scribing wheel can be enhanced. Accordingly, in the case of performing scribing on a brittle material-made substrate with use of the scribing wheels, upon the severing of the scribed brittle material-made substrate, the end face of the segmented substrate can be made with greater accuracy and higher strength.

Figure 8A:
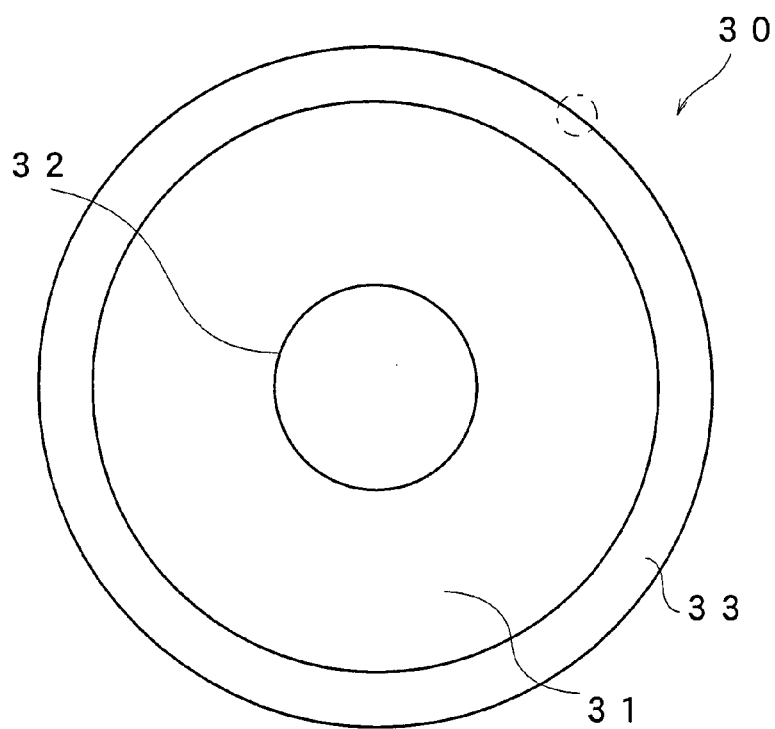
FIG. 8A is a front view of the scribing wheel in accordance with the fourth embodiment of the present invention.
Figure 8B:
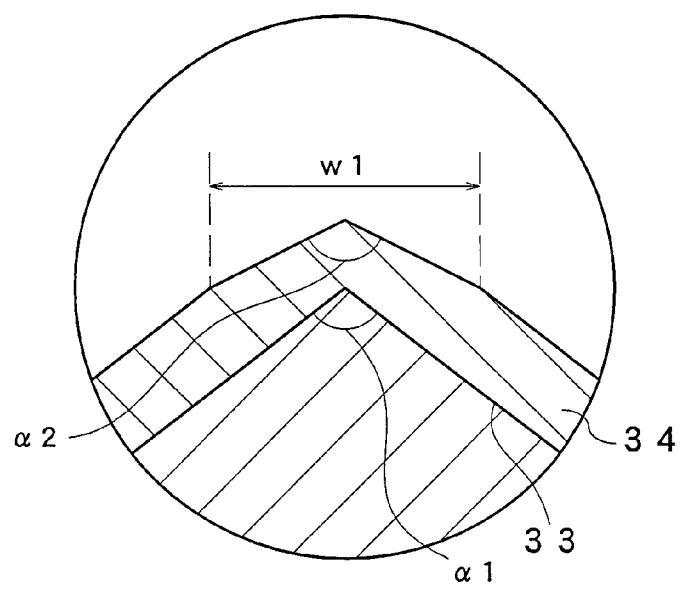
FIG. 8B is an enlarged sectional view of the ridge part of the fourth embodiment as observed after grinding process.

Next, the fourth embodiment of the present invention will be described. In Japanese Examined Patent Publication JP-B2 3074143, there is suggested a highly penetrative scribing wheel having formed at its periphery a number of grooves that are spaced apart to provide projections in between. The present invention is also applicable to such a scribing wheel. FIG. 8A is a front view of the scribing wheel in accordance with the fourth embodiment, FIG. 8B is an enlarged sectional view of a ridge part of the cutting edge of the scribing wheel, and FIG. 8C is an enlarged view of the circular part indicated by alternate long and short dashed lines in FIG. 8A. In the production of the scribing wheel, for example, as shown in FIG. 8A, the first step is to form a through hole 32 serving as an axial hole at the center of a cemented carbide or ceramic disc 31 prepared as a scribing-wheel base material. Then, a rotary shaft of a motor is inserted into the through hole 32. As the rotary shaft is rotated, the disc 31 is ground throughout its periphery from opposite sides so as to obtain a V-shaped configuration. The resultant inclined surface will be referred to as a ground surface 33. As is the case with the first embodiment, a vertex angle $\alpha 1$ of the ground surface 33 falls within a range from 80 degrees to 150 degrees. Also in this case, as is the case with the first embodiment, the cutting-edge part of the scribing wheel is coated with a diamond film 34 by the CVD method, and grinding is performed in a like manner. The diamond film 34 has a film thickness in a 10 μm to 30 μm range. An angle $\alpha 2$ of the ground vertex falls within a range from 85 degrees to 160 degrees. Moreover, the roughness of the ground ridge line, as well as the roughness of the ground inclined part are similar to those of the first embodiment. The difference between the vertex angle $\alpha 1$ of the ground surface 33 of the disc base material and the cutting-edge angle $\alpha 2$ falls within a range from 5 degrees to 20 degrees. Then, as shown in FIG. 8C, grooves 35 are formed within the range of the thickness of the diamond film 34. Since the scribing wheel is required to have a groove depth of, for example, about 10 μm in the interest of attaining high penetrability, by forming such grooves 35 in the diamond film 34, the scribing wheel can be rendered highly penetrative.

Alternatively, it is possible to form grooves at the V-shaped cutting edge of the scribing wheel in advance. Then, a diamond-film coating is applied by the CVD method and grinding process is carried out, whereby the construction of the scribing wheel can be completed.

EXAMPLES

Example 1

In accordance with the first embodiment, a scribing-wheel base material having an outer diameter of 2.7 mm has been coated with a diamond film and then ground by a honing stone, whereby a scribing wheel of example 1 having a cutting-edge angle of 132.7 degrees was produced.

Example 2

Moreover, in accordance with the fourth embodiment, a scribing-wheel base material having an outer diameter of 2.7 mm has been coated with a diamond film and then ground by the mechanical grinding technique thereby to obtain a scribing wheel having a cutting-edge angle of 133.9 degrees. Subsequently, a number of grooves were formed at the periphery of the scribing wheel, whereby a highly penetrative scribing wheel of example 2 was produced.

Comparative Example

Further, in accordance with the prior-art practice, a PCD-made scribing wheel which is 2.5 mm in outer diameter and 125 degrees in cutting-edge angle was fabricated, and subsequently a number of grooves were formed at the periphery thereof, whereby a highly penetrative scribing wheel of a comparative example was produced.

FIG. 9 is a chart showing the relationship between the distance of travel of each of the scribing wheels implemented by way of the examples 1 and 2 and the comparative example, respectively, in scribing operation for a 0.635 mm-thick alumina substrate (HTCC substrate), and the minimum load (lower limits of load range that permit formation of adequate scribe lines) on each of that scribing wheels in scribing operation for a 0.7 mm-thick glass material. In the chart, the travel distance of the scribing wheel of the example 1 is indicated by a broken line A, the travel distance of the scribing wheel of the example 2 is indicated by a broken line B, and the travel distance of the scribing wheel of the comparative example is indicated by a broken line C.

According to the findings as to the comparative example, the range of its travel capability for scribing was about 20 m. Furthermore, although the load as observed at the start-up of travel was as low as 0.09 MPa, as the scribing operation proceeded, the minimum load has gradually been increased, with the consequent abrasion of the ridge line. If such an abrasion-ridden scribing wheel is used to perform scribing on a brittle material-made substrate, upon the severing of the scribed substrate, the end face of the segmented substrate will suffer quality degradation.

On the other hand, according to the findings as to the examples 1 and 2 as seen from FIG. 9, in the scribing operation using the scribing wheel of the example 1, as indicated by the broken line A, the scribing wheel has traveled 130 m until after spalling of the diamond film. At this time, the minimum load has been maintained substantially constant at a value of about 0.12 MPa during the time interval between the start-up of scribing and occurrence of spalling of the diamond film.

Moreover, in the scribing operation using the scribing wheel of the example 2, as indicated by the broken line B, the scribing wheel has traveled 85 m until after spalling of the diamond film. At this time, the minimum load has been maintained substantially constant at a value of about 0.16 MPa during the time interval between the start-up of scribing and occurrence of spalling of the diamond film. In contrast to the comparative example, the examples 1 and 2 are capable of a remarkable increase in the distance of travel for scribing operation. Moreover, in either case, the minimum load could be maintained substantially constant without any appreciable increase regardless of the distance of travel. From this fact, it can be judged that there was little wearing down of the cutting edge of the scribing wheel of the examples. Accordingly, in a case where a brittle material-made substrate is scribed by the scribing wheel, and is then severed for production of liquid crystal panels or the like, the end face of the segmented article can be made with greater accuracy and higher strength.

While specific embodiments of the invention have been shown and described in detail to illustrate the application of the principles of the invention, it will be understood that the invention may be embodied otherwise without departing from such principles.

What is claimed is:

1. A scribing wheel comprising:
   a scribing-wheel base material made of cemented carbide;
   a diamond film formed on a cutting-edge part of said scribing-wheel base material; and
   a ground region which is a strip region including a ridge line of said cutting-edge part formed by grinding said diamond film by a mechanical grinding technique, wherein a difference between an angle of a vertex of said scribing-wheel base material and an angle of at least a part of said ground region is within a range from five to twenty degrees and an arithmetic average roughness of said ground region and an arithmetic average roughness of said ridge line are less than or equal to 0.015 µm.

2. A scribing wheel according to claim 1, wherein:
   said scribing-wheel base material has a form of a disc with a largest-diameter part and inclined surfaces formed at a periphery of said scribing-wheel base material; and
   said scribing-wheel base material has formed at the periphery a columnar circumferential surface whose axis coincides with a central axis.

3. A scribing wheel according to claim 1, wherein said scribing-wheel base material has a form of a disc with a largest-diameter part and inclined surfaces formed at a periphery of said scribing-wheel base material, and said scribing-wheel base material has formed at the periphery a circumferential surface whose axis coincides with said central axis, the circumferential surface being curved either inwardly or outwardly.

4. A scribing wheel according to claim 1, wherein said scribing-wheel base material has formed at a periphery thereof a circumferential surface whose axis coincides with a central axis, the circumferential surface having a V-shaped section defined by either of an inwardly-bent shape or an outwardly-bent shape.

5. A scribing wheel according to claim 1, wherein said scribing wheel is designed as a scribing wheel for scribing ceramic substrates.

6. A scribing wheel according to claim 1, wherein a ridge part of said ground region is formed with grooves that are spaced apart to provide projections in between.

7. A scribing wheel according to claim 1, wherein said diamond film in at least said ground region has a thickness of 10 µm to 30 µm, wherein said mechanical grinding technique is applied to an extent of said diamond film, said extent having a width in a range from 10 µm to 30 µm, said ground region being located in said extent.

8. A scribing method for scribing a brittle material-made substrate, the scribing method comprising:
   providing a scribing wheel comprising a scribing-wheel base material and a diamond film formed on a cutting-edge part of said scribing-wheel base material, said scribing-wheel base material being formed of cemented carbide, wherein a ground region which is a strip region including a ridge line of said cutting-edge part and is formed by grinding said diamond film by a mechanical grinding technique, wherein a difference between an angle of a vertex of said scribing-wheel base material and an angle of said at least a portion of said ground region is within a range from five to twenty degrees, and an arithmetic average roughness of said ground region and an arithmetic average roughness of said ridge line are less than or equal to 0.015 µm.

9. A method for scribing according to claim 8, wherein said scribing wheel is designed as a scribing wheel for scribing ceramic substrates, wherein said mechanical grinding technique is applied to an area of said diamond film, said area having a width within a range from 10 µm to 30 µm, said ground region being located in said area.

10. A scribing method for scribing a brittle material-made substrate, the scribing method comprising:
    providing a scribing-wheel base material comprising cemented carbide;
    providing a diamond film on a cutting-edge part of said scribing-wheel base material; and
    grinding an area of said diamond film via a mechanical grinding technique to form a scribing wheel with a ground region, said area having a width in a range of 10 µm to 30 µm, said ground region comprising a strip area, said strip area comprising a ridge line of said cutting-edge part, said ridge line having an average ridge line roughness, said ground region comprising an average ground region roughness, wherein a difference between an angle of a vertex of said scribing-wheel base material and an angle of at least a portion of said ground region is within a range from five to twenty degrees, said average ridge line roughness and said average ground region roughness being less than 0.015 µm.

11. A scribing method according to claim 10, wherein said angle of said vertex of said scribing-wheel base material is defined by a first scribing-wheel base material surface and a second scribing-wheel base material surface, said angle of said ground region being defined by a first diamond film surface and a second diamond film surface, said ground region comprising a first ground region surface and a second ground region surface, said first ground region surface having a first ground region surface first end portion and a first ground region surface second end portion, said second ground region surface comprising a second ground region surface first end portion and a second ground region surface second end portion, said second ground region surface second end portion and said first ground region surface second end portion defining said ridge line of said cutting-edge part, wherein a distance between said first ground region surface first end portion and said second ground region surface first end portion defines said ground region width.

12. A scribing method according to claim 11, wherein said diamond film directly engages said scribing wheel base material, said first diamond film surface and said second diamond film surface having a ground outer peripheral surface, said ground outer peripheral surface comprising a material contact area for directly engaging a material to be scribed, said first scribing-wheel base material surface and said second scribing-wheel base material surface defining a scribing-wheel base material peak, said first diamond film surface and said second diamond film surface defining a ground region peak, wherein said first diamond film surface and said second diamond film surface are not parallel to said first scribing-wheel base material surface and said second scribing-wheel base material surface.

13. A scribing method according to claim 11, wherein said angle of said vertex of said scribing-wheel base material is greater than or equal to ninety degrees and less than or equal to one-hundred and fifty degrees, said angle of said cutting-edge part being greater than or equal to eighty-five degrees and less than one-hundred and fifty degrees.

14. A scribing method according to claim 11, further comprising:
  scribing a ceramic substrate with said scribing wheel, wherein a vertex of said angle of said ground region is substantially aligned with said vertex of said scribing-wheel base material.

15. A scribing method according to claim 10, wherein:
  said scribing-wheel base material has a form of a disc with a largest-diameter part and inclined surfaces formed at a periphery of said scribing-wheel base material; and
  said scribing-wheel base material has formed at the periphery a columnar circumferential surface whose axis coincides with a central axis of said scribing-wheel base material.

16. A scribing method according to claim 10, wherein said scribing-wheel base material has a form of a disc with a largest-diameter part and inclined surfaces formed at a periphery of said scribing-wheel base material, and said scribing-wheel base material has formed at the periphery a circumferential surface whose axis coincides with said central axis of said scribing-wheel base material, the circumferential surface being curved either inwardly or outwardly.

17. A scribing method according to claim 10, wherein said scribing-wheel base material has formed at a periphery thereof a circumferential surface whose axis coincides with a central axis of said scribing-wheel base material, the circumferential surface having a V-shaped section defined by either of an inwardly-bent shape or an outwardly-bent shape.

18. A scribing method according to claim 10, wherein said diamond film is in direct contact with said scribing wheel base material, said ground region having a ground outer peripheral surface, said ground outer peripheral surface comprising a material contact area for directly engaging a material to be scribed, said scribing-wheel base material comprising a scribing-wheel base material area having a scribing-wheel base material first portion and a scribing-wheel base material second portion, said scribing-wheel base material first portion and said scribing-wheel base material second portion defining a scribing-wheel base material peak, said ground region having a first ground region portion and a second ground region portion, said first ground region portion and said second ground region portion defining a ground region peak, wherein said first ground region portion and said second ground region portion are not parallel to said scribing-wheel base material first portion and said scribing-wheel base material second portion.

19. A scribing method according to claim 10, wherein a ridge part of said ground region is formed with grooves that are spaced apart to provide projections in between said grooves.

20. A scribing method according to claim 10, wherein said diamond film is in direct contact with said scribing-wheel base material, said ground region having a ground outer peripheral surface, said ground outer peripheral surface comprising a material contact area for directly engaging a material to be scribed, said scribing-wheel base material comprising a scribing-wheel base material area having a scribing-wheel base material first portion and a scribing-wheel base material second portion, said scribing-wheel base material first portion and said scribing-wheel base material second portion defining a scribing-wheel base material peak, said scribing-wheel base material peak having a scribing-wheel base material contour, said ground region having a first ground region portion and a second ground region portion, said first ground region portion and said second ground region portion defining a ground region peak, said ground region peak having a ground region peak contour, said ground region peak contour being different from said scribing-wheel base material contour.

\* \* \* \* \*